United States Patent
Kawabata

[19]

[11] Patent Number: 5,159,457
[45] Date of Patent: Oct. 27, 1992

[54] HIGH ACCURACY BLEMISH COMPENSATOR FOR DEFECTIVE PIXELS OF A CCD

[75] Inventor: Akihiko Kawabata, Kanagawa, Japan

[73] Assignee: Sony Corporation, Tokyo, Japan

[21] Appl. No.: 753,416

[22] Filed: Aug. 30, 1991

[30] Foreign Application Priority Data

Sep. 6, 1990 [JP]  Japan ................................. 2-234595

[51] Int. Cl.⁵ ............................................. H04N 5/335
[52] U.S. Cl. ........................... 358/213.17; 358/213.16; 358/213.11; 358/213.15
[58] Field of Search ...................... 358/213.15, 213.16, 358/213.17, 213.23, 213.24, 213.28, 162, 163, 167, 177, 221

[56] References Cited

U.S. PATENT DOCUMENTS

| | | | |
|---|---|---|---|
| 4,237,488 | 12/1980 | Takehura | 358/163 |
| 4,494,145 | 1/1985 | Kokufukata et al. | 358/163 |
| 4,558,366 | 12/1985 | Nagelho | 358/213.15 |
| 4,639,775 | 1/1987 | Cohen et al. | 358/106 |
| 4,703,442 | 10/1987 | Levine | 358/163 |
| 4,760,453 | 7/1988 | Hieda | 358/213.16 |
| 4,922,337 | 5/1990 | Hunt et al. | 358/101 |

Primary Examiner—Michael Razavi
Assistant Examiner—Tuan V. Ho
Attorney, Agent, or Firm—Alvin Sinderbrand; William S. Frommer

[57] ABSTRACT

In an adjustment operational mode, a charge coupled device (CCD) having pixels with a blemish, that is, a defect which is temperature dependent, is driven so that the CCD accumulates N times as much charge as in an ordinary operational mode. A corresponding offset voltage is supplied to a temperature sensor so that a blemish compensation signal from a blemish compensation signal generator can be adjusted with high accuracy. In the adjustment mode, the temperature of the CCD is raised, so that the level of the blemish component of the signal output from the CCD is large enough to be accurately adjusted. In an ordinary operational mode, the compensation signal from the blemish compensation signal generator which has been level-adjusted with high accuracy in the adjustment operational mode is added to an image pick-up output signal of the CCD to produce a blemish compensated signal adjusted with high accuracy.

2 Claims, 2 Drawing Sheets

HIGH ACCURACY BLEMISH COMPENSATOR FOR DEFECTIVE PIXELS OF A CCD

FIELD OF THE INVENTION

This invention relates to an apparatus for generating a blemish compensation signal to be mixed with an image pick-up output signal from a solid-state image pick-up device, to compensate for defects in the image pick-up output signal.

DESCRIPTION OF PRIOR ART

Generally, it is known that, in solid-state image pick-up devices such as CCDs (Charge Coupled Devices), etc. formed with semiconductor image elements, there can occur a defective pixel or image element, which outputs a signal of a singular level even in the state where no light is incident. Such a defective pixel may be caused by a local crystal defect, etc. of the semiconductor image element, resulting in deterioration in the picture quality due to an erroneous image pick-up output from the defective pixel. As types of defective pixels in the solid-state image pick-up device, there are known e.g., a black flaw defective pixel appearing as a black point and a white flaw defective pixel appearing as a white point in a pictorial image on a monitor screen corresponding to the image pick-up output of the defective pixel. From the defective pixel, there is provided an output in which an offset voltage corresponding to a defective level is added to an image pick-up output corresponding to an incident light quantity.

A defect of this kind having temperature dependency is called a blemish. A blemish compensator is used to detect a temperature of a solid-state image pick-up device and to add a blemish compensation signal to which temperature compensation has been implemented on the basis of the defected temperature, to an image pick-up output signal from the solid-state image pick-up device, thus to compensate such a blemish.

However, the blemish component of a solid-state image pick-up device having temperature dependency has a relatively low signal level at an ordinary. So, if blemish compensation is carried out at an ordinary temperature, the adjustment accuracy of the blemish compensation signal cannot be sufficiently high. As a result, deterioration in the picture quality due to compensation error cannot be avoided.

Further, in order to carry out blemish compensation with a high accuracy, it is sufficient to employ, e.g., an approach to place the solid-state image pick-up device in a high temperature state to increase the magnitude of the signal level from the defective pixel. However, such an approach has the problems that an equipment of a large scale thermostatic chamber for maintaining a high temperature state is required, and that application of a high temperature results in a shortened life time of the solid-state image pick-up device.

OBJECT AND SUMMARY OF THE INVENTION

With the actual circumstances as described above in view, an object of the present invention is to reduce deterioration in the picture quality due to blemish compensation error. Another object of the present invention is to permit the signal level of a blemish compensation signal to be adjusted with a high accuracy at an ordinary temperature.

A blemish compensator according to this invention comprises means operative in an adjustment mode for generating an offset voltage based on a temperature dependence characteristic of the defective pixels, means for detecting a temperature of the charge coupled device and for providing a temperature signal based on the temperature and the offset voltage, means for generating a compensation signal in accordance with the temperature signal, means for driving the charge coupled device in the adjustment mode so that an adjustment charge accumulating period of the charge coupled device is N times as long as a standard charge accumulating period, and means for mixing the compensation signal with the output signal of the charge coupled device, thereby producing a blemish compensated signal adjusted with high accuracy.

DETAILED DESCRIPTION OF THE PREFERRED EMBODIMENT

Explanation will now be given in detail with reference to the attached drawings of a preferred embodiment of a blemish compensator according to this invention.

Figure 1:
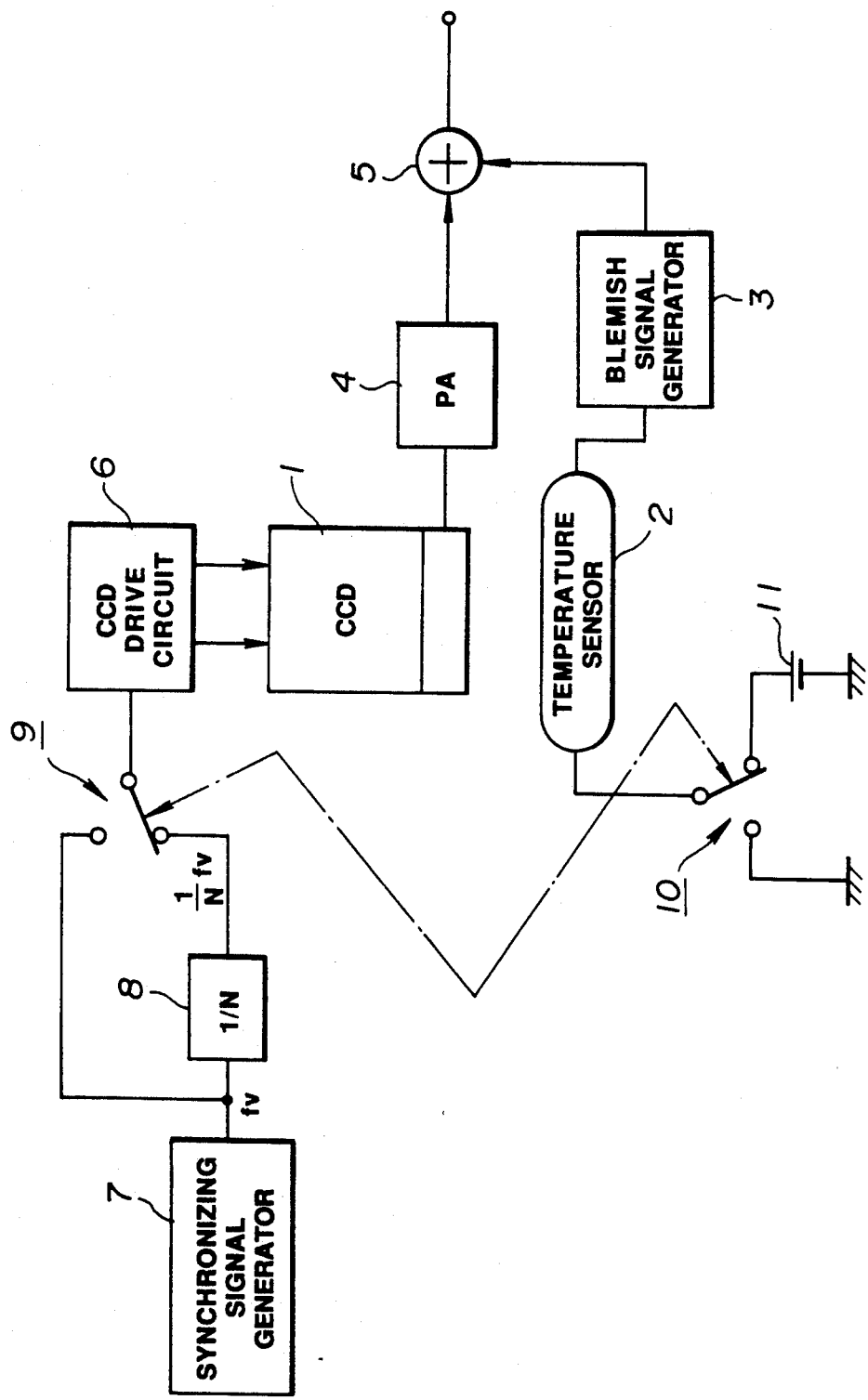
FIG. 1 is a block diagram showing a blemish compensator according to this invention.

A blemish compensator according to this invention is constructed as shown in FIG. 1, for example.

The blemish compensator shown in FIG. 1 is applied to a a CCD image sensor (1) by using a temperature sensor (2) to detect a temperature of the CCD image sensor, and a blemish compensation signal generator (3) to generate a blemish compensation signal on the basis of the output from the temperature sensor (2). Using a signal adder (5), the blemish compensation signal from the blemish signal generator (3) is added to an image pick-up output signal $CCD_{out}$ outputted through a process amplifier (4) from the CCD image sensor (1), thereby producing a blemish compensated signal adjusted with high accuracy.

In this blemish compensator, a CCD drive circuit (6) for driving the CCD image sensor (1) is selectively supplied through a changeover switch (9) with a vertical synchronizing signal fv that a synchronizing signal generator (7) generates and a 1/N frequency-divided vertical synchronizing signal 1/N fv obtained by frequency-dividing the vertical synchronizing signal fv by 1/N at a frequency divider (8).

Figure 2:
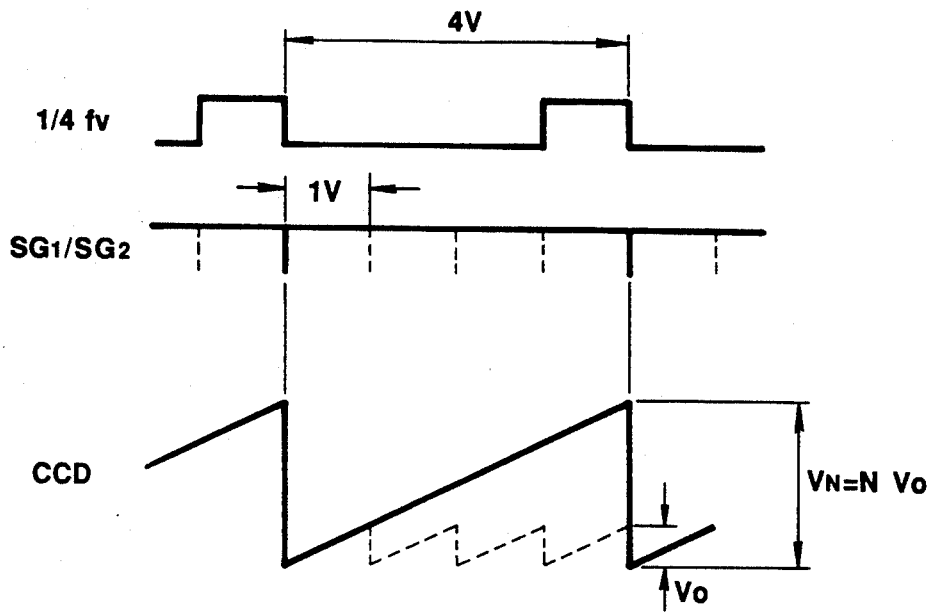
FIG. 2 is a timing chart showing the operation of the blemish compensator.
Figure 3:
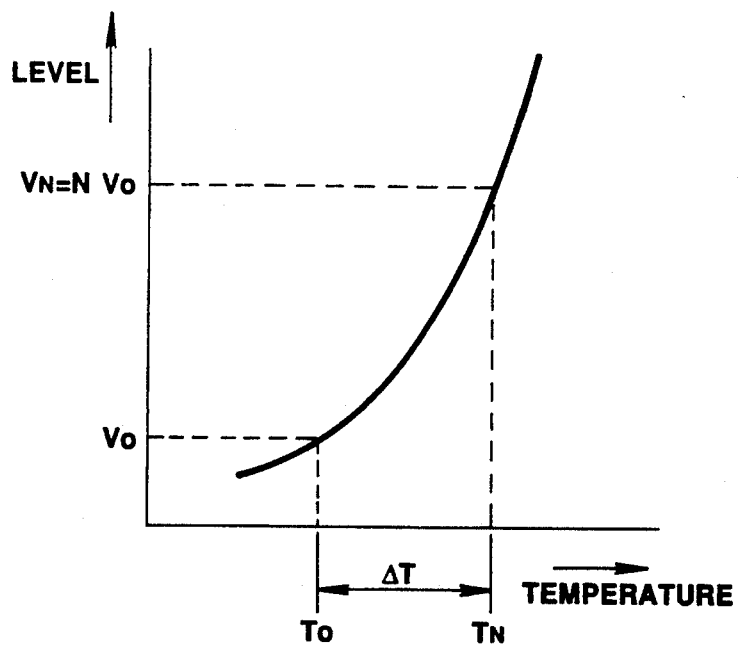
FIG. 3 is a diagram showing the temperature characteristic of a CCD image sensor compensated by the blemish compensator of FIG. 1.

In an ordinary operational mode, the vertical synchronizing signal fv from the synchronizing signal generator (7) is selected by the switch (9). In this ordinary operational mode, as indicated by broken lines in FIG. 2, the CCD drive circuit (6) drives the CCD image sensor (1) in ordinary charge storage time corresponding to an one vertical interval 1V by a sensor gate pulse $SG_1$ for reading out charges stored in the CCD image sensor (1) every one vertical interval 1V in synchronism with the vertical synchronizing signal fv.

In an adjustment operational mode, the 1/N frequency-divided vertical synchronizing signal from the frequency divider (8) is selected by the changeover switch (9). In this adjustment operational mode, as indicated by the solid line in FIG. 2, the CCD drive circuit (6) drives the CCD image sensor (1) for a charge storage time NV which is N times longer than the ordinary charge storage time 1V using a sensor gate pulse $SG_2$ for reading out charges stored in the CCD image sensor (1) every N vertical intervals in synchronism with the 1/N frequency-divided vertical synchronizing signal 1/N fv.

Here, in the above-mentioned adjustment operational mode where the CCD image sensor (1) is driven in a charge storage time NV which is N times longer than the ordinary charge storage time 1V, a quantity of charge which is N time larger than that accumulated in the above-mentioned ordinary operational mode is stored.

Further, in this blemish compensator, one end of the temperature sensor (2) is selectively connected to the ground point and an offset power supply (11) through a changeover switch (10) switched in synchronism with the changeover switch (9) connected to the CCD drive circuit (6).

In the ordinary operational mode where the changeover switch (9) selects the vertical synchronizing signal fv, one end of the temperature sensor (2) is grounded through the changeover switch (10). On the other hand, in the adjustment operational mode where the changeover switch (6) selects the 1/N frequency-divided vertical synchronizing signal 1/N fv, one end of the temperature sensor (2) is connected to the offset power supply (11) through the changeover switch (10).

Here, when the CCD image sensor (1) is driven in a charge storage time N times longer than an ordinary charge storage time, a quantity of charge N times larger than that in the ordinary operational mode is stored. As a result, the output level of the CCD image sensor (1) is elevated to a level N times larger than that in the ordinary mode. The offset power supply (11) supplies, to a temperature detected output by the temperature sensor (2), an offset voltage corresponding to a temperature elevation $\Delta T$ in which an elevation N of the output level is allowed to correspond to an elevation of the output level by the temperature characteristic of the CCD image sensor (1).

Assuming now that the general expression of the temperature characteristic of the CCD image sensor (1) is $K^{\Delta T}$, the following relationship holds:

$$N = K^{\Delta T}$$

The above relationship is rewritten as follows:

$$\Delta T = \frac{\log N}{\log K}$$

When it is assumed that the temperature characteristic of, e.g., the so called white flaw defect is (1.8) 1/10, $V_N$ is a white flaw defect level at a temperature $T_N$, and $V_O$ is a white flaw defect level at a temperature $T_O$, the following relationship holds:

$$\frac{V_N}{V_O} = 1.8^{\frac{\Delta T}{10}}$$

Thus, the temperature difference $\Delta T = T_N - T_O$ is expressed as follows:

$$\Delta T = \frac{10 \log \frac{V_N}{V_O}}{\log 1.8}$$

When N in the adjustment operational mode is assumed to be, e.g., 4, $\Delta T$ is expressed as follows:

$$\Delta T = \frac{10 \log 4}{\log 1.8}$$

Namely, this temperature difference corresponds to a temperature elevation of about 23.6° C.

In view of this, when the temperature characteristic of the temperature sensor (2) is assumed to be 10 mV/°C., the offset power supply (11) supplies, in the adjustment operational mode, an offset voltage of 0.236 V corresponding to the temperature elevation of 23.6° C. to the temperature sensor (2).

In the adjustment operational mode, an offset voltage of 0.236 V is supplied to the temperature sensor (2), and in the state where N is assumed as 4 to drive the CCD image sensor (1) in a charge storage time four times longer than an ordinary charge storage time, the signal level of a blemish compensation signal that the blemish compensation signal generator (3) generates is adjusted to a reasonable level, thereby making it possible to carry out the level adjustment of the blemish compensation signal generator (3) with a high accuracy in the state equivalent to the state where the temperature of the CCD image sensor (1) is elevated to 23.6° C.

In addition, in the ordinary operational mode, the blemish compensation signal from the blemish compensation signal generator (3) which has been level-adjusted with a high accuracy in the adjustment operational mode in a manner stated above is added to and synthesized with the image pick-up output signal $CCD_{OUT}$ of the CCD image sensor (1), thereby making it possible to implement a reasonable blemish compensation having less compensation error.

As stated above, in the blemish compensator according to this invention, in the state where an offset corresponding to a temperature elevation in which an elevation of the output level of a solid-state image pick-up device resulting from the fact that the solid-state image pick-up device is caused to be operative in a charge storage time N times longer than an ordinary charge storage time is allowed to correspond to an elevation of the output level by the temperature characteristic of the solid-state image pick-up device is supplied to a temperature detected output by the temperature detector means, the signal level of a blemish compensation signal that the blemish compensation signal generator means generates is adjusted. Thus, it is possible to adjust the signal level of the blemish compensation signal with a high accuracy at an ordinary temperature without necessity of a large equipment such as a thermostatic chamber, etc.

Accordingly, in accordance with this invention, it is possible to provide a blemish compensator capable of implementing a reasonable blemish compensation having less deterioration in the picture quality due to any compensation error.

Although an illustrative embodiment of the present invention has been described in detail herein with reference to the accompanying drawings, it is to be understood that the invention is not limited to this precise embodiment, and that various changes and modifications may be effected therein by one skilled in the art without departing from the scope or spirit of the invention as defined in the appended claims.

What is claimed is:

1. An apparatus for compensating for blemished pixels of a charge coupled device having a standard charge accumulating period and which produces an output signal, said apparatus comprising:
   means operative in an adjustment mode for generating an offset voltage based on a temperature-blemish level characteristic of said defective pixels,
   means for detecting a temperature of said charge coupled device and for providing a temperature signal based on said temperature and said offset voltage,
   means for generating a compensation signal in accordance with said temperature signal,
   means for driving said charge coupled device in said adjustment mode so that an adjustment charge accumulating period of said charge coupled device is N times as long as said standard charge accumulating period, and
   means for mixing said compensation signal with the output signal of said charge coupled device, thereby producing a blemish compensated signal adjusted with high accuracy.

2. An apparatus according to claim 1, in which said means for driving includes
   a clock pulse generator for generating clock pulses in accordance with said standard charge accumulating period,
   and a frequency divider operative in said adjustment mode for reducing a frequency of said clock pulses by 1/N.

* * * * *